US011165600B2

(12) United States Patent
Inoue et al.

(10) Patent No.: US 11,165,600 B2
(45) Date of Patent: Nov. 2, 2021

(54) TRANSMITTING STATION FOR DETECTING STATE CHANGE OF DATA STORED IN MEMORY

(71) Applicants: Kabushiki Kaisha Toshiba, Minato-ku (JP); Toshiba Infrastructure Systems & Solutions Corporation, Kawasaki (JP)

(72) Inventors: Atsushi Inoue, Kawasaki (JP); Motohiko Okabe, Fuchu (JP); Shinji Takahashi, Kokubunji (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 175 days.

(21) Appl. No.: 16/314,926

(22) PCT Filed: Mar. 19, 2018

(86) PCT No.: PCT/JP2018/010709
§ 371 (c)(1),
(2) Date: Jan. 3, 2019

(87) PCT Pub. No.: WO2018/186160
PCT Pub. Date: Oct. 11, 2018

(65) Prior Publication Data
US 2019/0205134 A1 Jul. 4, 2019

(30) Foreign Application Priority Data

Apr. 3, 2017 (JP) .............................. JP2017-073762

(51) Int. Cl.
G06F 9/30 (2018.01)
H04L 12/40 (2006.01)

(52) U.S. Cl.
CPC .... *H04L 12/40006* (2013.01); *G06F 9/30101* (2013.01); *G06F 9/30185* (2013.01)

(58) Field of Classification Search
CPC .......... H04L 12/40006; G06F 9/30101; G06F 9/30185
See application file for complete search history.

(56) References Cited

U.S. PATENT DOCUMENTS

2003/0110344 A1 6/2003 Szczepanek et al.
2012/0042032 A1* 2/2012 Fredette ................ H04L 45/125
709/214

(Continued)

FOREIGN PATENT DOCUMENTS

JP 7-391 42 U 7/1995
WO 2015/163092 A1 10/2015
WO 2016/114559 A1 7/2016

OTHER PUBLICATIONS

International Search Report dated Jun. 12, 2018 in PCT/JP2018/010709 filed Mar. 19, 2018, 2 pages.

*Primary Examiner* — Jyoti Mehta
(74) *Attorney, Agent, or Firm* — Oblon, McClelland, Maier & Neustadt, L.L.P.

(57) ABSTRACT

A transmitting station includes a common memory, a receiver, a state-change information memory, a state-change table storage, and a state-change detection controller. The common memory includes a plurality of blocks storing therein data that is periodically broadcast by scan transmission among other transmitting stations. The state-change detection controller, when receiving the data from the other transmitting station, reads out from the state-change table storage a state detection word of the block corresponding to the other transmitting station of a transmission source of the relevant received data, and detects a state change of a word that is indicated by the common memory address stored in (Continued)

the state-change information memory in association with a target pointer that is an address pointer of the read-out state detection word.

7 Claims, 13 Drawing Sheets

(56) References Cited

U.S. PATENT DOCUMENTS

2017/0034033 A1 2/2017 Mizoguchi
2017/0374429 A1 12/2017 Yang

* cited by examiner

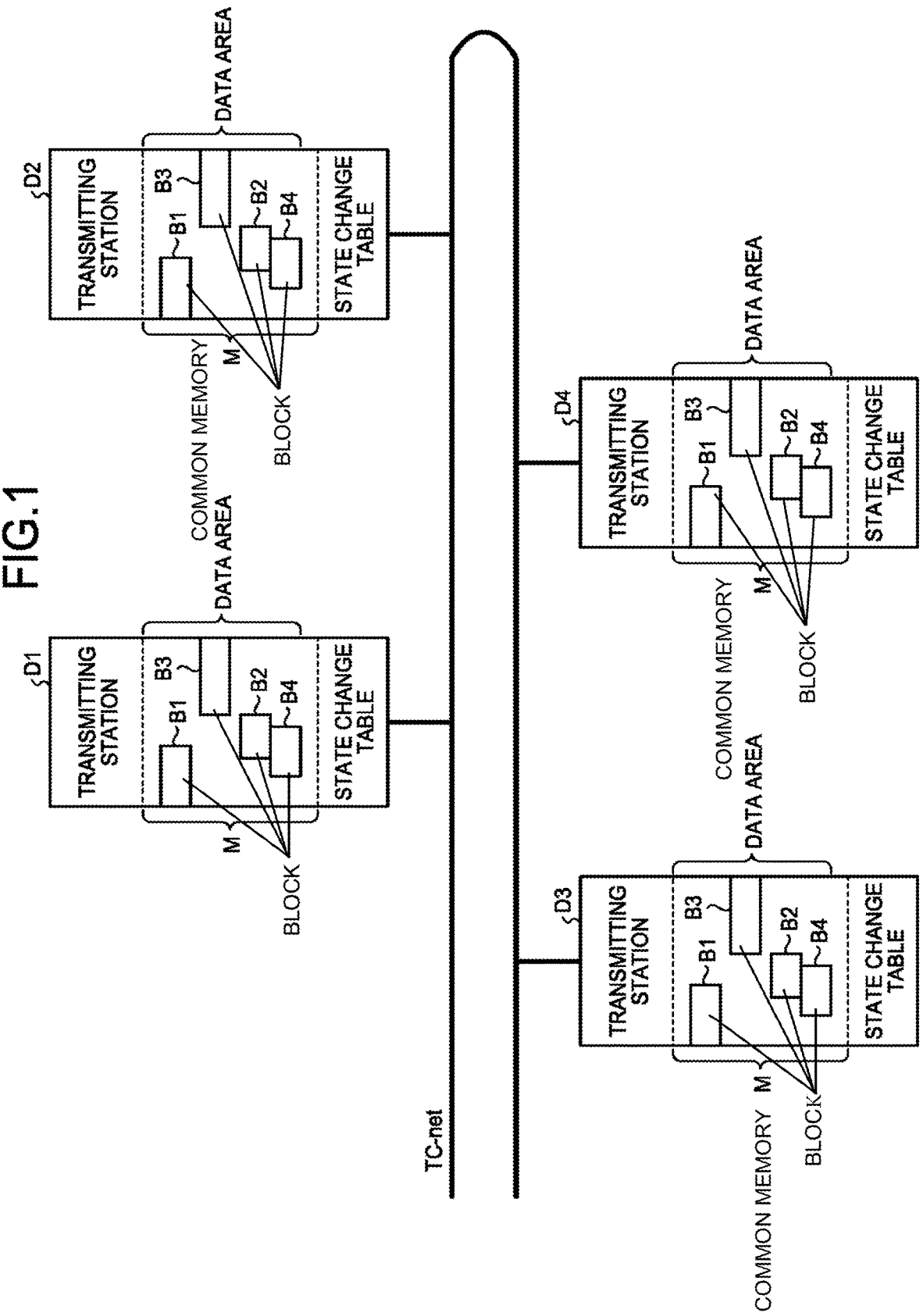

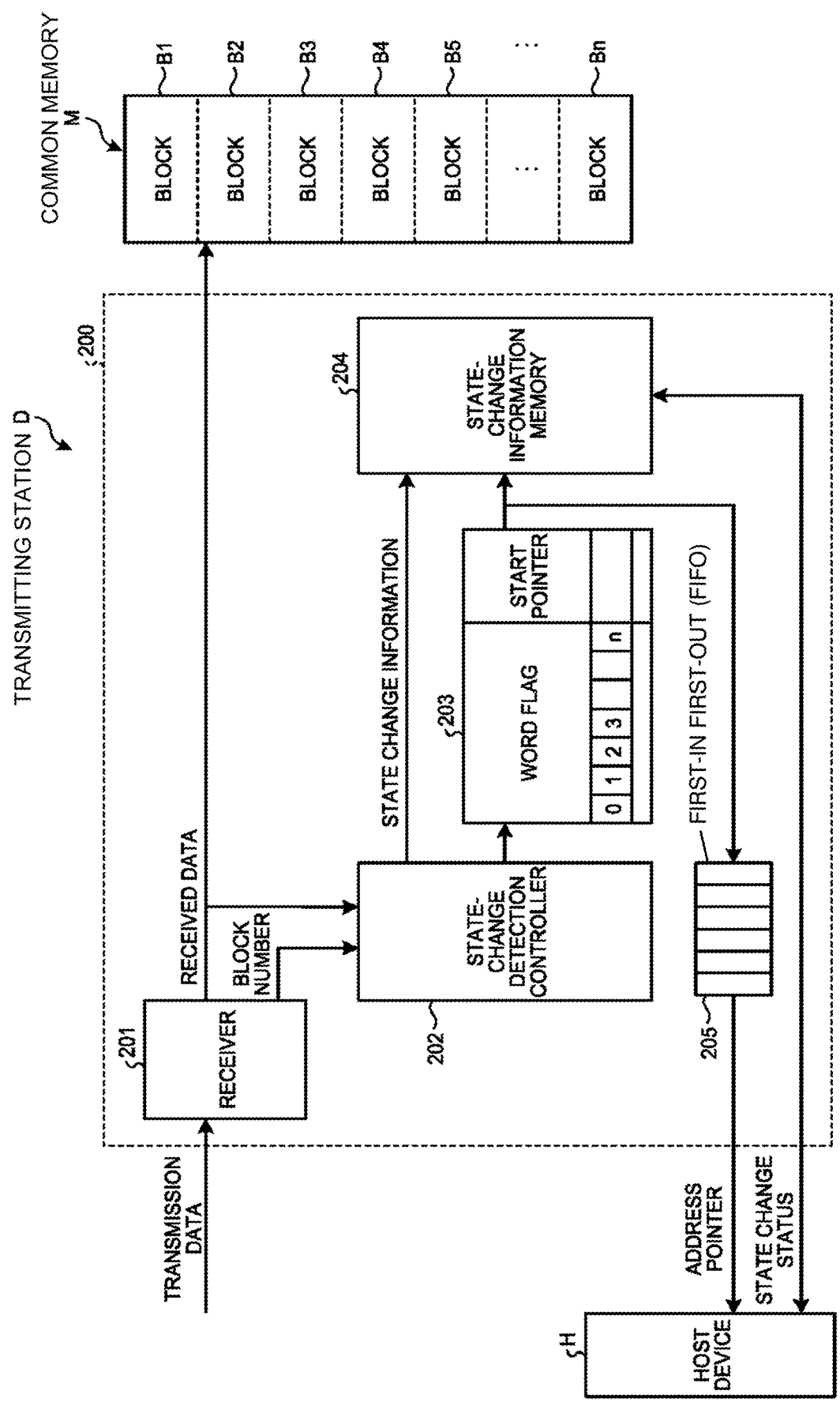

FIG.3

| ADDRESS POINTER | | 204 |
|---|---|---|
| 1 | OFF-TIME STATE CHANGE SPECIFYING INFORMATION | ON-TIME STATE CHANGE SPECIFYING INFORMATION |
| | COMMON MEMORY ADDRESS | |
| | OFF-TIME STATE CHANGE STATUS | ON-TIME STATE CHANGE STATUS |
| | NEXT POINTER | PREVIOUS VALUE |
| 2 | OFF-TIME STATE CHANGE SPECIFYING INFORMATION | ON-TIME STATE CHANGE SPECIFYING INFORMATION |
| | COMMON MEMORY ADDRESS | |
| | OFF-TIME STATE CHANGE STATUS | ON-TIME STATE CHANGE STATUS |
| | NEXT POINTER | PREVIOUS VALUE |
| ⋮ | ⋮ | ⋮ |
| N | OFF-TIME STATE CHANGE SPECIFYING INFORMATION | ON-TIME STATE CHANGE SPECIFYING INFORMATION |
| | COMMON MEMORY ADDRESS | |
| | OFF-TIME STATE CHANGE STATUS | ON-TIME STATE CHANGE STATUS |
| | NEXT POINTER | PREVIOUS VALUE |

FIG.4

| | BLOCK NUMBER (401) | DATA PORTION (402) | FCS |
|---|---|---|---|

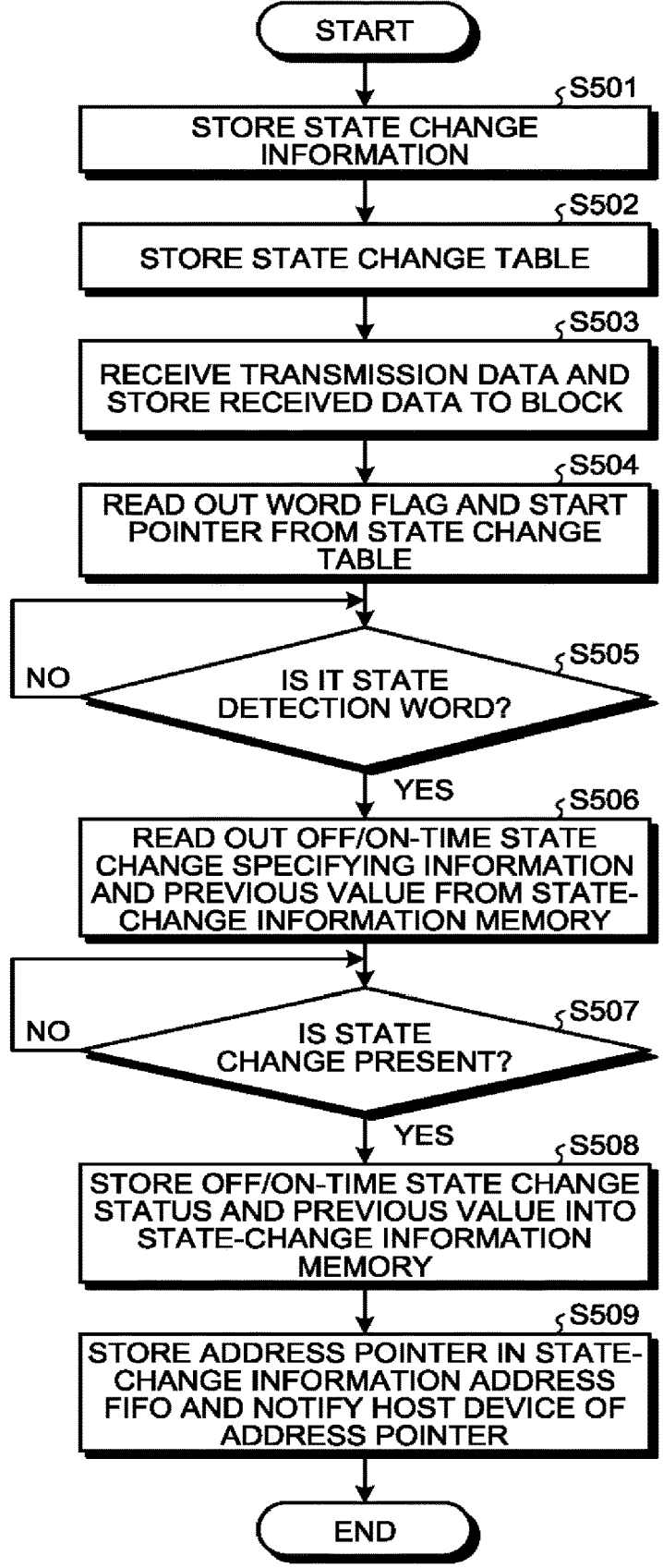

FIG.9

| ADDRESS POINTER | | | |
|---|---|---|---|
| 1 | | | ← 204 |
| | BLOCK NUMBER:2, WORD NUMBER:8 | | |
| | 1 | | |
| 2 | | | |
| | BLOCK NUMBER:2, WORD NUMBER:3 | | |
| | 1 | | |
| 3 | | | |
| | BLOCK NUMBER:1, WORD NUMBER:3 | | |
| | 3 | | |

203

| | | WORD FLAG | | | | | | | | | | | | | | | START POINTER |
|---|---|---|---|---|---|---|---|---|---|---|---|---|---|---|---|---|---|
| | | n | 15 | 14 | 13 | 12 | 11 | 10 | 9 | 8 | 7 | 6 | 5 | 4 | 3 | 2 | 1 | |
| BLOCK NUMBER | 1 | 0 | 0 | 0 | 0 | 0 | 0 | 0 | 0 | 0 | 0 | 0 | 0 | 1 | 0 | 0 | 3 |
| | 2 | 0 | 0 | 0 | 0 | 0 | 0 | 0 | 1 | 0 | 0 | 0 | 0 | 1 | 0 | 0 | 2 |

FIG.10

| ADDRESS POINTER | | | |
|---|---|---|---|
| 1 | | | ~204 |
| 1 | BLOCK NUMBER:2, WORD NUMBER:8 | | |
| 1 | | | |
| 1 | 1 | | |
| 2 | | | |
| 2 | BLOCK NUMBER:2, WORD NUMBER:3 | | |
| 2 | | | |
| 2 | 1 | | |

203

| | | WORD FLAG | | | | | | | | | | | | | | | START POINTER |
|---|---|---|---|---|---|---|---|---|---|---|---|---|---|---|---|---|---|
| | | n | 15 | 14 | 13 | 12 | 11 | 10 | 9 | 8 | 7 | 6 | 5 | 4 | 3 | 2 | 1 | |
| BLOCK NUMBER | 1 | 0 | 0 | 0 | 0 | 0 | 0 | 0 | 0 | 0 | 0 | 0 | 0 | 0 | 0 | 0 | 0 | 0 |
| BLOCK NUMBER | 2 | 0 | 0 | 0 | 0 | 0 | 0 | 0 | 0 | 1 | 0 | 0 | 0 | 0 | 1 | 0 | 0 | 2 |

FIG.11

| ADDRESS POINTER | | |
|---|---|---|
| 1 | | |
| | BLOCK NUMBER:2, WORD NUMBER:8 | ← 204 |
| | | |
| | 1 | |
| 2 | | |
| | BLOCK NUMBER:2, WORD NUMBER:3 | |
| | | |
| | 1 | |
| 3 | | |
| | BLOCK NUMBER:1, WORD NUMBER:3 | |
| | | |
| | 3 | |
| 4 | | |
| | BLOCK NUMBER:1, WORD NUMBER:1 | |
| | | |
| | 3 | |

203

| | | WORD FLAG | | | | | | | | | | | | | | | START POINTER |
|---|---|---|---|---|---|---|---|---|---|---|---|---|---|---|---|---|---|
| | | n | 15 | 14 | 13 | 12 | 11 | 10 | 9 | 8 | 7 | 6 | 5 | 4 | 3 | 2 | 1 | |
| BLOCK NUMBER | 1 | 0 | 0 | 0 | 0 | 0 | 0 | 0 | 0 | 0 | 0 | 0 | 0 | 1 | 0 | 1 | 3⇒4 |
| | 2 | 0 | 0 | 0 | 0 | 0 | 0 | 0 | 1 | 0 | 0 | 0 | 0 | 1 | 0 | 0 | 2 |

FIG.12

| ADDRESS POINTER | | |
|---|---|---|
| 1 | BLOCK NUMBER:2, WORD NUMBER:8 | |
| | 1 | |
| 2 | BLOCK NUMBER:2, WORD NUMBER:3 | |
| | 1 | |
| 3 | BLOCK NUMBER:1, WORD NUMBER:3 | |
| | 3⇒5 | |
| 4 | BLOCK NUMBER:1, WORD NUMBER:1 | |
| | 3 | |
| 5 | BLOCK NUMBER:1, WORD NUMBER:10 | |
| | 5 | |

← 204

| | | WORD FLAG | | | | | | | | | | | | | | | START POINTER |
|---|---|---|---|---|---|---|---|---|---|---|---|---|---|---|---|---|---|
| | | n | 15 | 14 | 13 | 12 | 11 | 10 | 9 | 8 | 7 | 6 | 5 | 4 | 3 | 2 | 1 | |
| BLOCK NUMBER | 1 | 0 | 0 | 0 | 0 | 0 | 0 | 1 | 0 | 0 | 0 | 0 | 0 | 1 | 0 | 1 | 4 |
| | 2 | 0 | 0 | 0 | 0 | 0 | 0 | 0 | 1 | 0 | 0 | 0 | 0 | 1 | 0 | 0 | 2 |

203

FIG.13
| ADDRESS POINTER | | |
|---|---|---|
| 1 | BLOCK NUMBER:2, WORD NUMBER:8 | |
| | 1 | |
| 2 | BLOCK NUMBER:2, WORD NUMBER:3 | |
| | 1 | |
| 3 | BLOCK NUMBER:1, WORD NUMBER:3 | |
| | 5⇒6 | |
| 4 | BLOCK NUMBER:1, WORD NUMBER:1 | |
| | 3 | |
| 5 | BLOCK NUMBER:1, WORD NUMBER:10 | |
| | 5 | |
| 6 | BLOCK NUMBER:1, WORD NUMBER:6 | |
| | 5 | |
204
| | | WORD FLAG | | | | | | | | | | | | | | START POINTER |
|---|---|---|---|---|---|---|---|---|---|---|---|---|---|---|---|---|
| | | n | 15 | 14 | 13 | 12 | 11 | 10 | 9 | 8 | 7 | 6 | 5 | 4 | 3 | 2 | 1 | |
| BLOCK NUMBER | 1 | 0 | 0 | 0 | 0 | 0 | 1 | 0 | 0 | 0 | 1 | 0 | 0 | 1 | 0 | 1 | 4 |
| | 2 | 0 | 0 | 0 | 0 | 0 | 0 | 0 | 1 | 0 | 0 | 0 | 0 | 1 | 0 | 0 | 2 |
203

FIG.14

| ADDRESS POINTER | | |
|---|---|---|
| 1 | BLOCK NUMBER:2, WORD NUMBER:8 | ← 204 |
| | 1 | |
| 2 | BLOCK NUMBER:2, WORD NUMBER:3 | |
| | 1⇒7 | |
| 3 | BLOCK NUMBER:1, WORD NUMBER:3 | |
| | 6 | |
| 4 | BLOCK NUMBER:1, WORD NUMBER:1 | |
| | 3 | |
| 5 | BLOCK NUMBER:1, WORD NUMBER:10 | |
| | 5 | |
| 6 | BLOCK NUMBER:1, WORD NUMBER:6 | |
| | 5 | |
| 7 | BLOCK NUMBER:2, WORD NUMBER:5 | |
| | 1 | |

203

| | | WORD FLAG | | | | | | | | | | | | | | | START POINTER |
|---|---|---|---|---|---|---|---|---|---|---|---|---|---|---|---|---|---|
| | | n | 15 | 14 | 13 | 12 | 11 | 10 | 9 | 8 | 7 | 6 | 5 | 4 | 3 | 2 | 1 | |
| BLOCK NUMBER | 1 | 0 | 0 | 0 | 0 | 0 | 0 | 1 | 0 | 0 | 0 | 1 | 0 | 0 | 1 | 0 | 1 | 4 |
| | 2 | 0 | 0 | 0 | 0 | 0 | 0 | 0 | 0 | 1 | 0 | 0 | 1 | 0 | 1 | 0 | 0 | 2 |

TRANSMITTING STATION FOR DETECTING STATE CHANGE OF DATA STORED IN MEMORY

CROSS-REFERENCE TO RELATED APPLICATIONS

This application is the national stage application of International Application No. PCT/JP2018/010709, filed Mar. 19, 2018, which designates the United States, incorporated herein by reference, and which claims the benefit of priority from Japanese Application No. 2017-073762, filed on Apr. 3, 2017, the entire contents of which are incorporated herein by reference.

FIELD

An embodiment described herein relates to a transmitting station.

BACKGROUND

In a network of real-time Ethernet, a plurality of transmitting stations include a common memory. Data stored in the common memory of each transmitting station is updated by the data that is periodically broadcast by scan transmission among the transmitting stations. Accordingly, with the use of the common memory, each transmitting station shares the data with the other transmitting stations connected to the network.

Incidentally, in a real-time Ethernet network, each transmitting station detects a state change of data that is received from the respective transmitting stations in order to share the data and, based on the detection result of the state change of the data, performs various processing such as controlling of control equipment in a plant or the like. At that time, each transmitting station, at a predetermined period, reads out the data from all words included in a block corresponding to the respective transmitting stations in the common memory, and detects the state change of the relevant data. Thus, even if a state change of the data occurs within the predetermined period, because it is not possible to detect the state change of the data until the predetermined period elapses, the detection of the state change of the data may be delayed.

Means for Solving Problem

A transmitting station according to one embodiment includes a common memory, a receiver, a state-change information memory, a state-change table storage, and a state-change detection controller. The common memory includes a plurality of blocks capable of storing therein data that is periodically broadcast by scan transmission among other transmitting stations. The receiver receives data from the other transmitting stations and stores the relevant received data in the block corresponding to the other transmitting station of a transmission source of the relevant received data out of the plurality of blocks. The state change information memory stores therein state change information that associates an address pointer indicating a word included in the block with a common memory address of the word in the common memory. The state-change table storage stores therein a state change table indicating, for each block, a state detection word to detect a state change out of the words included in the relevant block. The state-change detection controller, when receiving data from the other transmitting station, reads out the state detection word of the block corresponding to the other transmitting station of the transmission source of the relevant received data from the state-change table storage, and detects a state change of the word that is indicated by the common memory address stored in the state-change information memory in association with a target pointer that is the address pointer of the read-out state detection word.

BRIEF DESCRIPTION OF DRAWINGS

FIG. 1 is a diagram illustrating one example of a configuration of a transmitting system according to an embodiment;

FIG. 2 is a diagram illustrating one example of a functional configuration of a transmitting station of the transmitting system in the embodiment;

FIG. 3 is a diagram illustrating one example of a data configuration of a state-change information memory included in the transmitting station in the embodiment;

FIG. 4 is a diagram for explaining one example of a format of transmission data received by the transmitting station in the embodiment;

FIG. 5 is a flowchart illustrating one example of procedures of detection processing of a state change in transmission data stored in a common memory of the transmitting station in the embodiment;

FIG. 9 is a diagram for explaining the one example of the generation processing of the state change table and the state change information in the transmitting system in the embodiment;

FIG. 10 is a diagram for explaining the one example of the generation processing of the state change table and the state change information in the transmitting system in the embodiment;

FIG. 11 is a diagram for explaining the one example of the generation processing of the state change table and the state change information in the transmitting system in the embodiment;

FIG. 12 is a diagram for explaining the one example of the generation processing of the state change table and the state change information in the transmitting system in the embodiment;

FIG. 13 is a diagram for explaining the one example of the generation processing of the state change table and the state change information in the transmitting system in the embodiment; and FIG. 14 is a diagram for explaining the one example of the generation processing of the state change table and the state change information in the transmitting system in the embodiment.

DETAILED DESCRIPTION

Figure 6:
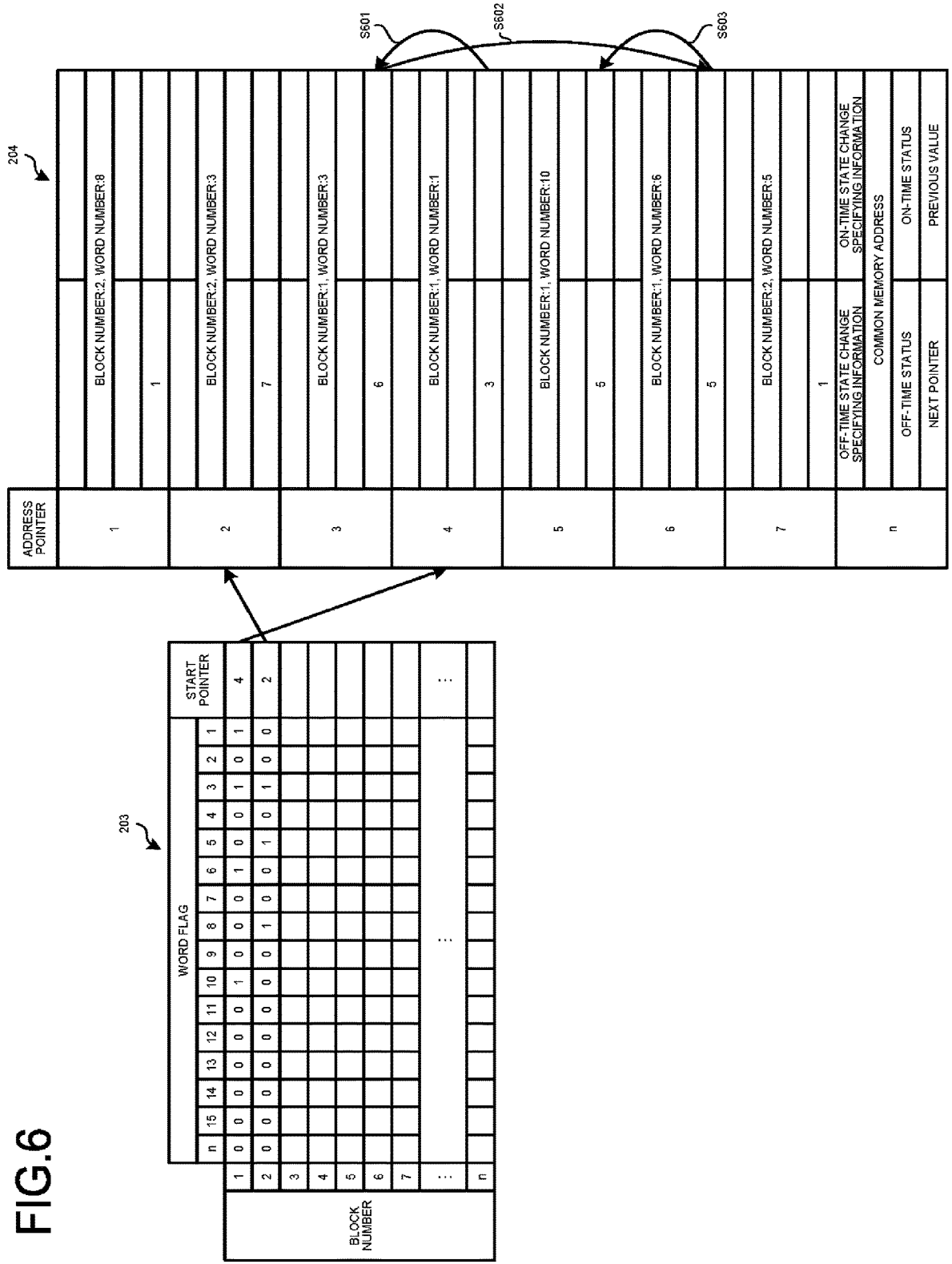
FIG. 6 is a diagram for explaining one example of the detection processing of a state change in the transmission data stored in the common memory of the transmitting station in the embodiment.

In general, and according to embodiments, a transmission station includes a common memory, a receiver, a state-change information memory, a state-change table storage, and a state-change detection controller. The common memory includes a plurality of blocks storing therein data that is periodically broadcast by scan transmission among other transmitting stations. The receiver receives data from the other transmitting stations and stores the relevant received data in the block corresponding to the other transmitting station of a transmission source of the relevant received data out of the plurality of blocks. The state-change information memory stores therein state change information that associates an address pointer indicating a word included in the block with a common memory address of the word in the common memory. The state-change table storage stores therein a state change table indicating, for each block, a state detection word to detect a state change out of the words included in the relevant block. The state-change detection controller, when receiving data from the other transmitting station, reads out the state detection word of the block corresponding to the other transmitting station of the transmission source of the relevant received data from the state-change table storage, and detects a state change of the word that is indicated by the common memory address stored in the state-change information memory in association with a target pointer that is the address pointer of the read-out state detection word.

With reference to the accompanying drawings, the following describes a transmitting system to which a transmitting station according to an exemplary embodiment has been applied.

FIG. 1 is a diagram illustrating one example of a configuration of the transmitting system in the embodiment. As illustrated in FIG. 1, the transmitting system includes a plurality of transmitting stations D1 to D4 (hereinafter described as the transmitting station D when there is no need to distinguish the transmitting stations D1 to D4) capable of performing communication with one another via a network of real-time Ethernet (such as TC-net standardized in IEC61784-2/61158). The transmitting station D includes a common memory M. The common memory M is a memory that includes a plurality of blocks B1 to B4 (hereinafter described as the block B when there is no need to distinguish the blocks B1 to B4) capable of storing therein the data that is periodically broadcast by scan transmission among the other transmitting stations D (hereinafter referred to as the transmission data).

The common memory M includes the block B for each transmitting station D connected via the network. For example, the block B1 is a block to store therein the transmission data that is broadcast from the transmitting station D1. The block B2 is a block to store therein the transmission data that is broadcast from the transmitting station D2. The block B3 is a block to store therein the transmission data that is broadcast from the transmitting station D3. The block B4 is a block to store therein the transmission data that is broadcast from the transmitting station D4.

The transmitting station D broadcasts, by scan transmission, the transmission data that is stored in the block B corresponding to the relevant transmitting station D to the other transmitting stations D, via a network such as real-time Ethernet. Accordingly, the common memory M of each transmitting station D included in the transmitting system is updated to identical content, and each transmitting station D shares the transmission data stored in the common memory M. Furthermore, the transmitting station D detects a state change of the transmission data stored in each block B of the common memory M. Then, the transmitting station D transmits a detection result of the state change in the transmission data stored in each block B of the common memory M to an external device such as a host device H.

FIG. 2 is a diagram illustrating one example of a functional configuration of the transmitting station of the transmitting system in the embodiment. As illustrated in FIG. 2, the transmitting station D of the transmitting system in the embodiment includes a controller 200 and the common memory M. The common memory M, as illustrated in FIG. 2, includes a plurality of blocks B1 to Bn for the respective transmitting stations D. The controller 200 is made up of an integrated substrate such as a field-programmable gate array (FPGA), and executes various processing such as control processing of control equipment such as valves in a plant.

Specifically, the controller 200 includes a receiver 201, a state-change detection controller 202, a state-change table storage 203, a state-change information memory 204, and a state-change information address first-in first-out (FIFO) 205. The receiver 201 receives the transmission data from the other transmitting stations D in the transmitting system. Then, the receiver 201 stores the relevant received transmission data into the block B corresponding to the other transmitting station D of a transmission source of the relevant received transmission data out of the plurality of blocks B included in the common memory M.

The state-change information memory 204 stores therein state change information that associates an address pointer that indicates a word W included in each block B of the common memory M with an address of the word W in the common memory M (hereinafter referred to as the common memory address). The word is a region capable of storing the transmission data of a predetermined number of bits. For example, one word is a region capable of storing data of 16 bits. In the embodiment, the common memory address includes the number of a block B in which the word W is included (hereinafter referred to as the block number) and the number of a word W (hereinafter referred to as the word number).

The state-change table storage 203 stores therein, for each block B of the common memory M, a state change table indicating a state detection word that is a word to detect a state change, out of the words W included in the relevant block B. In the embodiment, the state-change table storage 203 stores therein, for each block B, a start pointer that is an address pointer of the word W to start detecting a state change, out of the words W included in the relevant block B. Furthermore, in the embodiment, the state-change table storage 203 stores therein, for each block B, a word flag that makes it possible to identify the word W to detect a state change, out of the words W included in the relevant block B.

That is, the state-change table storage 203 stores therein the state change table that associates the block number, the start pointer, and the word flag. In the embodiment, the word flag is set for each word W included in the block B. Then, the word flag is set to 1 when the transmission data stored in the word W is the word W to detect a state change, and is set to 0 when the transmission data stored in the word W is not the word W to detect a state change.

The state-change detection controller 202, when the transmission data from the other transmitting station D is received by the receiver 201, reads out from the state-change table storage 203 the state detection word of the block B corresponding to the other transmitting station D that is the transmission source of the relevant received transmission data. Then, the state-change detection controller 202 detects the state change of the word W that is indicated by the common memory address stored in the state-change information memory 204 in association with a target pointer that is the address pointer of the relevant read-out state detection word.

Accordingly, because the state change of the transmission data that is stored in the common memory M is detected when receiving the transmission data from the other transmitting station D, the state change of the transmission data that is stored in the common memory M can be immediately detected and omission of detection of the state change in the transmission data can be prevented. In addition, because only the state detection word out of the words W included in the common memory M is accessed, as the access to the common memory M is not occupied by the detection of the state change in the transmission data, deterioration in the processing efficiency of the transmitting system using the common memory M can be suppressed.

Next, with reference to FIG. 3, one example of a data configuration of the state-change information memory 204 included in the transmitting station D in the embodiment will be described. FIG. 3 is a diagram illustrating one example of the data configuration of the state-change information memory included in the transmitting station in the embodiment.

As illustrated in FIG. 3, the state-change information memory 204 is a memory that stores therein the state change information that associates the address pointer, off-time state change specifying information, on-time state change specifying information, the common memory address, an off-time state change status, an on-time state change status, a next pointer, and a previous value.

The address pointer is the information that makes it possible to identify the word W. The off-time state change specifying information is the information that specifies the detection of a state change from 1 to 0 in the transmission data stored in the word W. The on-time state change specifying information is the information that specifies the detection of a state change from 0 to 1 in the transmission data stored in the word W. The common memory address is the address of the word W in the common memory M.

The off-time state change status is the information that is set when a state change from 1 to 0 in the transmission data stored in the word W is detected. The on-time state change status is the information that is set when a state change from 0 to 1 in the transmission data stored in the word W is detected. The next pointer is the address pointer of the word W to detect a state change next. The previous value is the value of the transmission data at the previous detection of the state change in the relevant transmission data stored in the word W.

Next, with reference to FIG. 4, one example of a format of the transmission data received by the receiver 201 included in the transmitting station D in the embodiment will be described. FIG. 4 is a diagram for explaining one example of the format of the transmission data received by the transmitting station in the embodiment.

The transmission data received by the receiver 201, as illustrated in FIG. 4, includes the block number in a header portion 401, and includes received data to store in the block B in a data portion 402. The block number is a number indicating the block B to store the received data included in the transmission data. The receiver 201 receives the transmission data from the other transmitting station D. Then, the receiver 201 stores the received data that is included in the data portion 402 of the received transmission data into the block B indicated by the block number included in the header portion 401 of the relevant transmission data out of the blocks B included in the common memory M.

Next, with reference to FIG. 5, one example of procedures of detection processing of a state change in the transmission data stored in the common memory M of the transmitting station D in the embodiment will be described. FIG. 5 is a flowchart illustrating one example of the procedures of detection processing of a state change in the transmission data stored in the common memory of the transmitting station in embodiment.

First, the state-change detection controller 202, before receiving the transmission data, receives the state change information from the host device H (one example of an external device) and stores the relevant received state change information in the state-change information memory 204 (Step S501). Subsequently, the state-change detection controller 202 reads out the common memory address from the state-change information memory 204. Then, the state-change detection controller 202 stores into the state-change table storage 203 the state change table that associates the block number included in the read-out common memory address, the word flag of the word W included in the block B indicated by the relevant block number, and the start pointer that is the address pointer of the word W of the least word number out of the words W included in the block B that is indicated by the relevant block number (Step S502). That is, the state-change detection controller 202, when received the state change information, generates the state change table, and stores the relevant generated state change table into the state-change table storage 203.

Thereafter, the receiver 201 receives the transmission data from the other transmitting station D, and stores the received data included in the data portion 402 of the relevant received transmission data into the block B indicated by the block number included in the header portion 401 of the relevant received transmission data (Step S503). In the embodiment, the receiver 201 transfers, for each word W included in the block B indicated by the block number included in the header portion 401 of the received transmission data, the received data to store in the relevant word W to the common memory M.

The state-change detection controller 202, when receiving the transmission data from the other transmitting station D by the receiver 201, reads out front the state-change table storage 203 the start pointer associated with the block number included in the header portion 401 of the relevant received transmission data (Step S504). In other words, the state-change detection controller 202 reads out from the state-change table storage 203 the start pointer of the block B corresponding to the other transmitting station D of the transmission source of the received transmission data. Subsequently, the state-change detection controller 202 reads out from the state-change table storage 203 the word flag of each word W associated with the block number included in the header portion 401 of the received transmission data (Step S504).

Then, the state-change detection controller 202 determines whether each word W included in the block B indicated by the block number included in the header portion 401 of the received transmission data is the state detection word (Step S505). In the embodiment, the state-change detection controller 202 determines that the word W for which the read-out word flag indicates 1 is the state detection word, out of the words W included in the block B indicated by the block number included in the header portion 401 of the received transmission data. Then, the state-change detection controller 202 reads out from the state-change information memory 204 the off-time state change specifying information or the on-time state change specifying information and the previous value associated with the address pointer of the word W determined to be the state detection word (Step S506).

Furthermore, the state-change detection controller 202 detects the state change of the word W that is indicated by the common memory address associated with a target pointer that is the address pointer of the state detection word in the state-change information memory 204 (Step S507). At that time, the state-change detection controller 202 starts detecting the state change from the state detection word that is indicated by the common memory address stored in association with the relevant read-out start pointer in the state-change information memory 204.

In the embodiment, when the off-time state change specifying information is read out, the state-change detection controller 202 compares the received data stored in the word W with the read-out previous value and detects that the state of the relevant received data has been changed from 1 to 0. Meanwhile, when the on-time state change specifying information is read out, the state-change detection controller 202 compares the received data stored in the word W with the read-out previous value and detects that the state of the relevant received data has been changed from 0 to 1.

Furthermore, in the embodiment, the state-change detection controller 202 reads out the next pointer associated with the target pointer in the state-change information memory 204, each time the detection of the state change of a single state detection word is finished. Then, the state-change detection controller 202 detects the state change the state detection word that is indicated by the common memory address stored in association with the address pointer coinciding with the relevant read-out next pointer in the state-change information memory 204. The state-change detection controller 202 repeats the detection of the state change in the state detection word until the read-out next pointer coincides with the address pointer of the state detection word for which the state change was detected last.

Furthermore, if the state change of the state detection word is detected (Yes at Step S507), the state-change detection controller 202 stores, in association with the address pointer of the state detection word in the state-change information memory 204, the off-time state change status or the on-time state change status and the previous value that is the received data stored in the state detection word for which the state change has been detected (Step S508).

Moreover, the state-change detection controller 202 stores into the state-change information address FIFO 205 the address pointer of the state detection word for which the state change has been detected (Step S509). The state-change detection controller 202 (one example of a transmitting unit) transmits, to the host device H, the address pointer stored in the state-change information address FIFO 205, and the state change status (off-time state change status or on-time state change status) stored in the state-change information memory 204 in association with the address pointer stored in the state-change information address FIFO 205 (Step S509). Accordingly, because it is possible to notify the host device H and the like of only the address pointer of the word W in which the transmission data for which the state change was detected is stored, the access to the common memory M by the host device H can be reduced and the load of the host device H can be reduced.

Next, with reference to FIG. 6, one example of the detection processing of a state change in the transmission data stored in the common memory M of the transmitting station D in the embodiment will be described. FIG. 6 is a diagram for explaining one example of the detection processing of the state change in the transmission data stored in the common memory of the transmitting station in the embodiment.

For example, as illustrated in FIG. 6, the state-change table storage 203 stores therein, associated with the respective block numbers 1 and 2, the word flags and the start pointers. In the block B indicated by the block number 1, out of the words W included in the relevant block B, the words W for which 1 is set to the word flag (the words W indicated by the word numbers 1, 3, 6, 10) are the state detection words. Furthermore, in the block B indicated by the block number 1, out of the words W included in the relevant block B, the word W (the word W indicated by the word number 1) indicated by the start pointer 4 is the word W for which the state change is detected first.

In the block B indicated by the block number 2, out of the words W included in the relevant block B, the words W for which 1 is set to the word flag (the words W indicated by the word numbers 3, 5, 8) are the state detection words. In the block B indicated by the block number 2, out of the words W included in the relevant block B, the word W (the word W indicated by the word number 3) indicated by the start pointer 2 is the word W for which the state change is detected first.

When detecting the state change of the block B that is indicated by the block number 1, the state-change detection controller 202 reads out the common memory address associated with the address pointer 4 coinciding with the start pointer 4 in the state-change information memory 204. Then, the state-change detection controller 202 reads out the received data from the word W (state detection word) indicated by the read-out common memory address (block number 1, word number 1), out of the words W included in the block B of the common memory M. Moreover, the state-change detection controller 202 compares the read-out received data with the previous value that is associated with the address pointer 4 in the state-change information memory 204, and detects the state change of the received data stored in the state detection word.

When finished the detection of the state change of the state detection word indicated by the common memory address associated with the address pointer 4, the state-change detection controller 202 reads out the next pointer 3 that is associated with the address pointer 4 in the state-change information memory 204. Then, the state-change detection controller 202 reads out the common memory address that is associated with the address pointer 3 coinciding with the next pointer 3 in the state-change information memory 204 (Step S601). Then, the state-change detection controller 202 reads out the received data from the word W (state detection word) indicated by the read-out common memory address (block number 1, word number 3), out of the words W included in the block B of the common memory M. Moreover, the state-change detection controller 202 compares the read-out received data with the previous value that is associated with the address pointer 3 in the state-change information memory 204, and detects the state change of the received data stored in the state detection word.

When finished the detection of the state change of the word W indicated by the common memory address associated with the address pointer 3, the state-change detection controller 202 reads out the next pointer 6 that is associated with the address pointer 3 in the state-change information memory 204. Then, the state-change detection controller 202 reads out the common memory address that is associated with the address pointer 6 coinciding with the next pointer 6 in the state-change information memory 204 (Step S602). Then, the state-change detection controller 202 reads out the received data from the word W (state detection word) indicated by the read-out common memory address (block number 1, word number 6), out of the words W included in the block B of the common memory M. Moreover, the state-change detection controller 202 compares the read-out received data with the previous value that is associated with the address pointer 6 in the state-change information memory 204, and detects the state change of the received data stored in the state detection word.

When finished the detection of the state change of the word W indicated by the common memory address associated with the address pointer 6, the state-change detection controller 202 reads out the next pointer 5 that is associated with the address pointer 6 in the state-change information memory 204. Then, the state-change detection controller 202 reads out the common memory address that is associated with the address pointer 5 coinciding with the next pointer 5 in the state-change information memory 204 (Step S603). Then, the state-change detection controller 202 reads out the received data from the word W (state detection word) indicated by the read-out common memory address (block number 1, word number 10), out of the words W included in the block B of the common memory M. Moreover, the state-change detection controller 202 compares the read-out received data with the previous value that is associated with the address pointer 5 in the state-change information memory 204, and detects the state change of the received data stored in the state detection word.

When finished the detection of the state change of the word W indicated by the common memory address associated with the address pointer 5, the state-change detection controller 202 reads out the next pointer 5 that is associated with the address pointer 5 in the state-change information memory 204. Then, when the address pointer 5 of the state detection word for which the state change was detected last and the read-out next pointer 5 are coincident, the state-change detection controller 202 ends the detection of the state change of the received transmission data. The state-change detection controller 202 performs it in the same manner when detecting the state change in the block B that is indicated by the block number 2.

Figure 7:
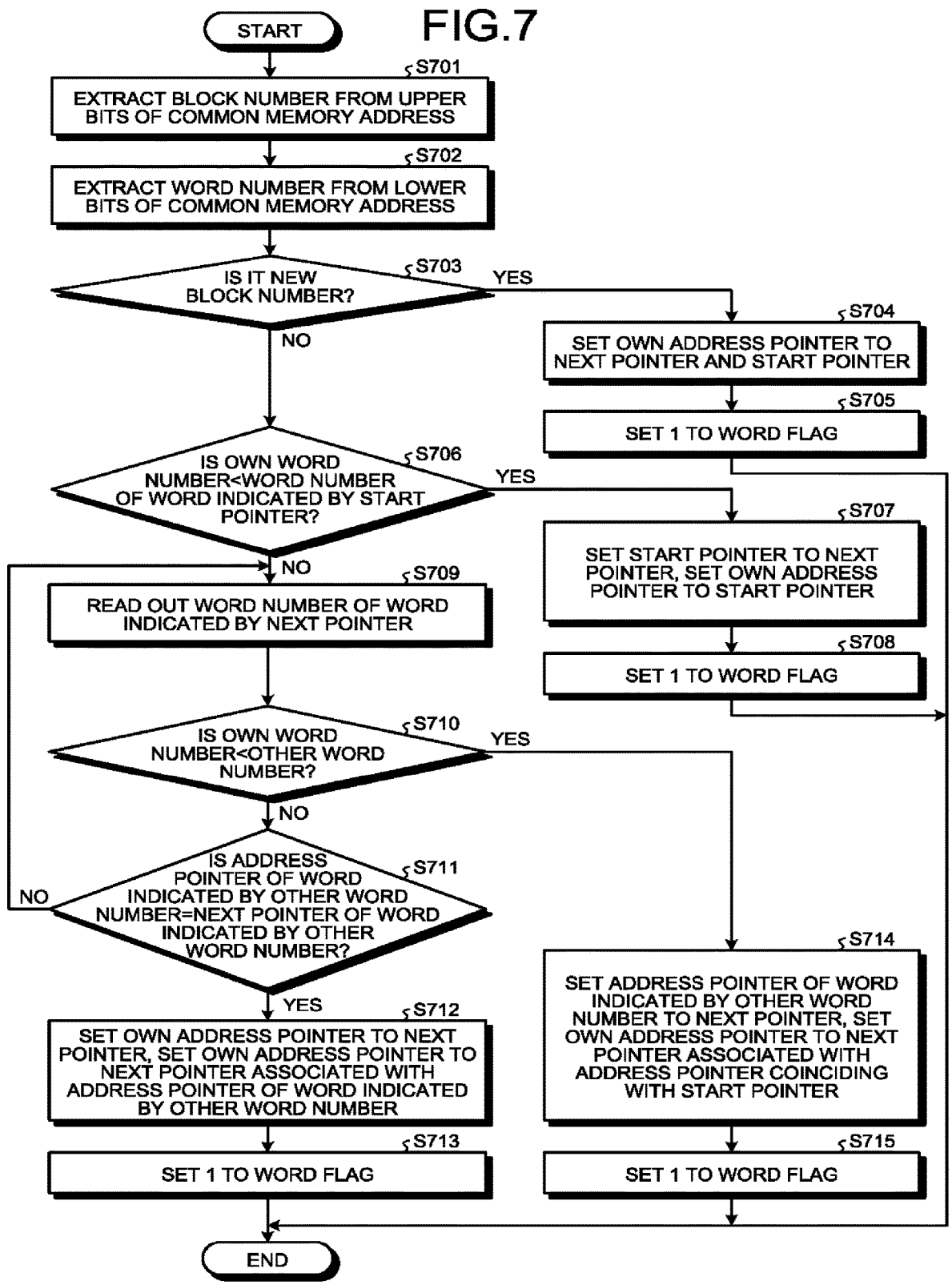
FIG. 7 is a flowchart illustrating one example of procedures in processing of generating a state change table and state change information in the transmitting system in the embodiment.

Next, with reference to FIGS. 7 to 14, one example of the procedures of generation processing of the state change table and the state change information performed by the transmitting station D in the embodiment will be described. FIG. 7 is a flowchart illustrating one example of the procedures in the processing of generating the state change table and the state change information in the transmitting system in the embodiment. FIGS. 8 to 14 are diagrams for explaining the one example of the generation processing of the state change table and the state change information in the transmitting system in the embodiment.

The state-change detection controller 202 extracts, in the state-change information memory 204, the block number (hereinafter referred to as the own block number) from the upper bits of the common memory address that is associated with each address pointer (hereinafter referred to as the own address pointer) (Step S701), and extracts the word number (hereinafter referred to as the own word number) from the lower bits of the relevant common memory address (Step S702). After that, the state-change detection controller 202 determines whether the own block number is a new block number that is not included in the state change table (Step S703). If the own block number is a new block number (Yes at Step S703), the state-change detection controller 202 sets the own address pointer to the next pointer and the start pointer (Step S704). Moreover, the state-change detection controller 202 sets, in the state change table, 1 to the word flag that is associated with the own block number and the own word number (Step S705).

Figure 8:
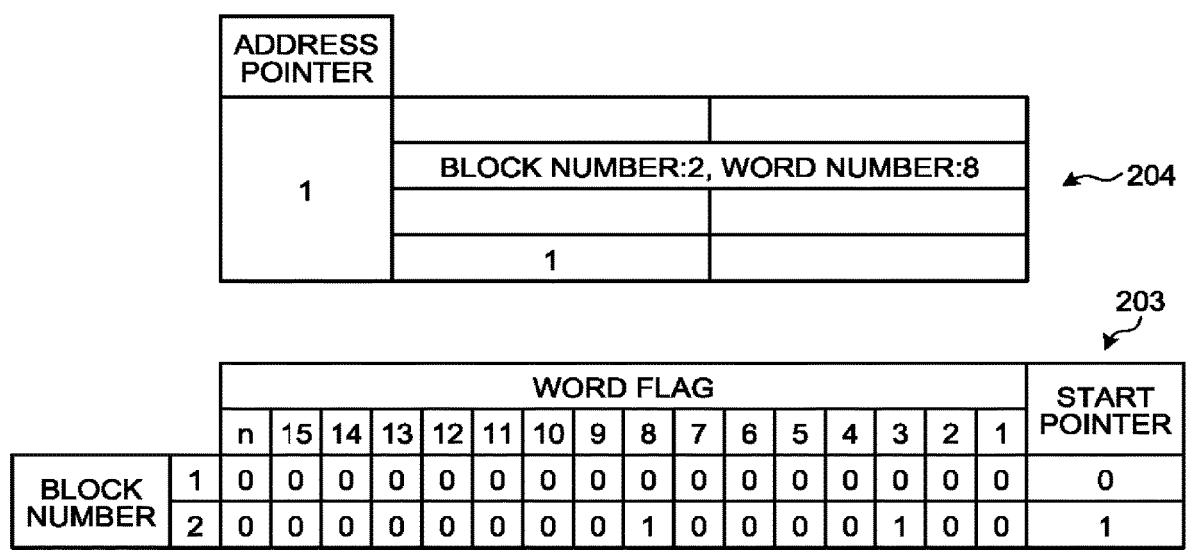
FIG. 8 is a diagram for explaining the one example of the generation processing of the state change table and the state change information in the transmitting system in the embodiment.

For example, as illustrated in FIG. 8, when the own address pointer is 1, the state-change detection controller 202 extracts the own block number 2 and the own word number 8 from the common memory address that is associated with the own address pointer 1 in the state-change information memory 204. After that, when the own block number 2 is a new block number not included in the state change table, the state-change detection controller 202 stores, by associating it with the own address pointer 1 in the state-change information memory 204, the relevant own address pointer 1 as the next pointer. Moreover, the state-change detection controller 202 stores in the state change table the own address pointer 1 as the start pointer, by associating it with the own block number 2. The state-change detection controller 202 further sets, in the state change table, 1 to the word flag that is associated with the own block number 2 and the own word number 8.

Furthermore, for example, as illustrated in FIG. 9, when the own address pointer is 3, the state-change detection controller 202 extracts the own block number 1 and the own word number 3 from the common memory address that is associated with the own address pointer 3 in the state-change information memory 204. After that, when the own block number 1 is a new block number not included in the state change table, the state-change detection controller 202 stores, by associating it with the own address pointer 3 in the state-change information memory 204, the relevant own address pointer 3 as the next pointer. Moreover, the state-change detection controller 202 stores in the state change table the own address pointer 3 as the start pointer, by associating it with the own block number 1. The state-change detection controller 202 further sets, in the state change table, 1 to the word flag that is associated with the own block number 1 and the own word number 3.

Referring back to FIG. 7, if determining that the own block number is not a new block number (No at Step S703), the state-change detection controller 202 determines whether the own word number is smaller than the word number of the word W that is indicated by the start pointer associated with the own block number in the state change table (Step S706). If the own word number is smaller than the word number of the word W that is indicated by the start pointer associated with the own block number in the state change table (Yes at Step S706), the state-change detection controller 202 sets the start pointer that is associated with the own block number in the state change table to the next pointer, and sets the own address pointer to the start pointer (Step S707). Moreover, the state-change detection controller 202 sets, in the state change table, 1 to the word flag that is associated with the own block number and the own word number (Step S708).

For example, as illustrated in FIG. 10, when the own address pointer is 2, the state-change detection controller 202 extracts the own block number 2 and the own word number 3 from the common memory address that is associated with the own address pointer 2 in the state-change information memory 204. After that, because the own word number 3 is smaller than the word number 8 of the word W that is indicated by the start pointer 1 associated with the own block number 2 in the state change table, the state-change detection controller 202 sets the start pointer 1 that is associated with the own block number 2 in the state change table to the next pointer that is associated with the own address pointer 2 in the state-change information memory 204. Furthermore, the state-change detection controller 202 sets the own address pointer 2 to the start pointer that is associated with the own block number 2 in the state change table. Moreover, the state-change detection controller 202 sets, in the state change table, 1 to the word flag that is associated with the own block number 2 and the own word number 3.

Furthermore, for example, as illustrated in FIG. 11, when the own address pointer is 4, the state-change detection controller 202 extracts the own block number and the own word number 1 from the common memory address that is associated with the own address pointer 4 in the state-change information memory 204. After that, because the own word number 1 is smaller than the word number 3 of the word W that is indicated by the start pointer 3 associated with the own block number 1 in the state change table, the state-change detection controller 202 sets the start pointer 3 that is associated with the own block number 1 in the state change table to the next pointer that is associated with the own address pointer 4 in the state-change information memory 204. Furthermore, the state-change detection controller 202 sets the own address pointer 4 to the start pointer that is associated with the own block number 1 in the state change table. Moreover, the state-change detection controller 202 sets, in the state change table, 1 to the word flag that is associated with the own block number 1 and the own word number 3.

Referring back to FIG. 7, if the own word number is larger than the word number of the word W that is indicated by the start pointer associated with the own block number in the state change table (No at Step S706), the state-change detection controller 202 reads out the word number (hereinafter referred to as the other word number) of the word W indicated by the next pointer that is associated with the address pointer coinciding with the start pointer in the state-change information memory 204 (Step S709). Then, the state-change detection controller 202 determines whether the own word number is smaller than the other word number (Step S710). If the own word number is larger than the other word number (No at Step S710), the state-change detection controller 202 determines whether the address pointer of the word W that is indicated by the other word number coincides with the next pointer associated with the address pointer of the word W that is indicated by the other word number in the state-change information memory 204 (Step S711).

If the address pointer of the word W indicated by the other word number coincides with the next pointer associated with the address pointer of the word W indicated by the relevant other word number in the state-change information memory 204 (Yes at Step S711), the state-change detection controller 202 sets the own address pointer to the next pointer that is associated with the relevant own address pointer in the state-change information memory 204 (Step S712). Furthermore, the state-change detection controller 202 sets the own address pointer to the next pointer associated with the address pointer of the word W indicated by the other word number in the state-change information memory 204 (Step S712). Moreover, the state-change detection controller 202 sets, in the state change table, 1 to the word flag that is associated with the own block number and the own word number (Step S713).

For example, as illustrated in FIG. 12, when the own address pointer is 5, the state-change detection controller 202 extracts the own block number 1 and the own word number 10 from the common memory address that is associated with the own address pointer 5 in the state-change information memory 204. In this case, because the own word number 10 is larger than the word number 1 of the word W that is indicated by the start pointer 4 associated with the own block number 1 in the state change table, the state-change detection controller 202 reads out the other word number 3 of the word W indicated by the next pointer associated with the address pointer coinciding with the start pointer 4 in the state-change information memory 204. When the own word number 10 is larger than the other word number 3, the state-change detection controller 202 determines whether the address pointer 3 of the word W indicated by the other word number 3 coincides with the next pointer 3 associated with the address pointer 3 of the word W indicated by the other word number 3 in the state-change information memory 204.

Then, when the address pointer 3 of the word W that is indicated by the other word number 3 coincides with the next pointer 3 associated with the address pointer 3 of the word W indicated by the relevant other word number 3 in the state-change information memory 204, the state-change detection controller 202 sets the own address pointer 5 to the next pointer 5 that is associated with the relevant own address pointer 5 in the state-change information memory 204. Furthermore, the state-change detection controller 202 sets the own address pointer 5 to the next pointer 5 associated with the address pointer of the word W indicated by the other word number 3 in the state-change information memory 204. Moreover, the state-change detection controller 202 sets, in the state change table, 1 to the word flag that is associated with the own block number 1 and the own word number 10.

Referring back to FIG. 7, if the own word number is smaller than the other word number (Yes at Step S710), the state-change detection controller 202 sets the address pointer of the word W, which is indicated by the other word number, to the next pointer associated with the own address pointer in the state-change information memory 204 (Step S714). Furthermore, the state-change detection controller 202 sets the own address pointer to the next pointer associated with the address pointer coinciding with the start pointer the state-change information memory 204 (Step S714). Moreover, the state-change detection controller 202 sets, in the state change table, 1 to the word flag that is associated with the own block number and the own word number (Step S715).

For example, as illustrated in FIG. 13, when the own address pointer is 6, the state-change detection controller 202 extracts the own block number 1 and the own word number 6 from the common memory address that is associated with the own address pointer 6 in the state-change information memory 204. In this case, because the own word number 6 is larger than the word number 1 of the word W that is indicated by the start pointer 4 associated with the own block number 1 in the state change table, the state-change detection controller 202 reads out the other word number 10 that is the largest next to the own word number 6 out of the word flags that are associated with the own block number 1 and are set to 1 in the state change table. Then, the state-change detection controller 202 sets the address pointer 5 of the word W, which is indicated by the other word number 10, to the next pointer 5 associated with the own address pointer 6 in the state-change information memory 204. Furthermore, the state-change detection controller 202 sets the own address pointer 6 to the next pointer 6 associated with the address pointer 3 of the word W indicated by the word number 3 that is the smallest next to the word number 6 indicated by the relevant own address pointer 6 in the state-change information memory 104. Moreover, the state-change detection controller 202 sets, in the state change table, 1 to the word flag that is associated with the own block number 1 and the word number 6.

Furthermore, for example, as illustrated in FIG. 14, when the own address pointer is 7, the state-change detection controller 202 extracts the own block number 2 and the own word number 5 from the common memory address that is associated with the own address pointer 7 in the state-change information memory 204. In this case, because the own word number 5 is larger than the word number 3 of the word W that is indicated by the start pointer 2 associated with the own block number 2 in the state change table, the state-change detection controller 202 reads out the other word number 8 that is the largest next to the own word number 5 in the state change table. Then, the state-change detection controller 202 sets the address pointer 1 of the word W, which is indicated by the other word number 8, to the next pointer 1 associated with the own address pointer 7 in the state-change information memory 204. Furthermore, the state-change detection controller 202 sets the own address pointer 7 to the next pointer 7 associated with the address pointer 2 of the word W indicated by the word number 3 that is the smallest next to the word number 5 indicated by the relevant own address pointer 7 in the state-change information memory 204. Moreover, the state-change detection controller 202 sets, in the state change table, 1 to the word flag that is associated with the own block number 2 and the word number 5.

As in the foregoing, according to the transmitting station D in the embodiment, when receiving the transmission data from the other transmitting station D by the receiver 201, by reading out the state detection word of the block B corresponding to the other transmitting station D of the transmission source of the relevant received transmission data from the state-change table storage 203, and detecting the state change of the word W indicated by the common memory address stored in the state-change information memory 204 in association with the target pointer that is the address pointer of the relevant read-out state detection word, the state change of the transmission data stored in the common memory M is detected when receiving the transmission data from the other transmitting station D Thus, it is possible to prevent the detection of the state change of the transmission data stored in the common memory M from being delayed.

Although the embodiment of the present invention has been exemplified in the foregoing, the embodiment described herein is presented as a mere example and is not intended to limit the scope of the invention. This novel embodiment described herein may be embodied in various other forms and, without departing from the scope of the invention, various omissions, substitutions, and modifications can be carried out. The embodiment thereof is included in the scope and spirit of the invention and is also included in the scope of the invention stated in the claims and the scope of the equivalents thereof.

The invention claimed is:

1. A transmitting station comprising:
   a common memory including a plurality of blocks storing therein data that is periodically broadcast by scan transmission among other transmitting stations, each of the plurality of blocks corresponding to a different one among the transmitting station and the other transmitting stations;
   a receiver configured to receive data from the other transmitting stations and store the received data in a block out of the plurality of blocks, the block corresponding to one of the other transmitting stations serving as a transmission source of the received data;
   a state-change information memory configured to store therein state change information that associates, for a word in each of the plurality of blocks in the common memory, an address pointer indicating the word with a common memory address of the word;
   a state-change table storage configured to store therein a state change table indicating, for each block of the plurality of blocks, a state detection word out of words in a corresponding block, the state detection word being a word to detect a state change; and
   a state-change detection controller configured to, when receiving data from one of the other transmitting stations, read out, from the state-change table storage, a state detection word in a block corresponding to the one of the other transmitting stations serving as a transmission source of the received data, and detect a state change of a word that is indicated by a common memory address stored in the state-change information memory in association with a target pointer corresponding to an address pointer of the state detection word read out from the state-change table storage.

2. The transmitting station according to claim 1, wherein
   the state-change table storage further stores therein a start pointer corresponding to an address pointer of a word to start detecting a state change, out of the words included in each of the plurality of blocks, and
   the state-change detection controller, when receiving the data from the one of the other transmitting stations, reads out, from the state-change table storage, a start pointer of a block corresponding to the one of the other transmitting stations serving as a transmission source of the received data, and starts detecting a state change from a word that is indicated by a common memory address stored in the state-change information memory in association with the start pointer read out from the state-change table storage.

3. The transmitting station according to claim 1, wherein
   the state-change information memory stores therein a next pointer corresponding to an address pointer of a word to next detect a state change, and
   the state-change detection controller reads out, from the state-change information memory, a next pointer associated with the target pointer each time detection of a state change of a single state detection word is finished, and detects the state change of the word that is indicated by the common memory address stored in the state-change information memory in association with an address pointer coinciding with the next pointer read out from the state-change information memory.

4. The transmitting station according to claim 1, wherein a word in each block is a region capable of storing a predetermined number of bits of data.

5. The transmitting station according to claim 1, wherein the state-change information memory stores therein, for each address pointer, a state change status indicating a detection result of a state change of a word indicated by a corresponding address pointer.

6. The transmitting station according to claim 5, further comprising:
   a first-in first-out (FIFO) configured to store therein an address pointer of the word for which a state change is detected by the state-change detection controller, and a transmitter configured to transmit, to an external host device, the address pointer stored in the FIFO, and the state change status stored in the state-change information memory in association with the address pointer stored in the FIFO.

7. The transmitting station according to claim 1, wherein the state-change detection controller receives the state change information from an external device, stores the received state change information in the state-change information memory, and, when receiving the state change information, generates the state change table and stores the generated state change table into the state-change table storage.

\* \* \* \* \*